United States Patent
Haughey (10) Patent No.: US 7,310,803 B2
(45) Date of Patent: Dec. 18, 2007

(54) METHOD AND SYSTEM FOR EXECUTING MULTIPLE TASKS IN A TASK SET

(75) Inventor: John Haughey, Richford, VT (US)

(73) Assignee: 419638 Canada Inc., St-Laurent, Quebec (CA)

( * ) Notice: Subject to any disclaimer, the term of this patent is extended or adjusted under 35 U.S.C. 154(b) by 658 days.

(21) Appl. No.: 09/981,883

(22) Filed: Oct. 19, 2001

(65) Prior Publication Data

US 2003/0078954 A1  Apr. 24, 2003

(51) Int. Cl.
G06F 9/48 (2006.01)

(52) U.S. Cl. .................... 718/107; 718/108

(58) Field of Classification Search ........ 718/100–108, 718/1
See application file for complete search history.

(56) References Cited

U.S. PATENT DOCUMENTS

| | | | | |
|---|---|---|---|---|
| 4,949,251 A * | 8/1990 | Griffin et al. | ............... | 714/20 |
| 4,954,948 A * | 9/1990 | Hira et al. | ............... | 718/107 |
| 5,161,226 A * | 11/1992 | Wainer | ............... | 710/264 |
| 5,287,508 A * | 2/1994 | Hejna et al. | ............... | 718/102 |
| 5,293,620 A * | 3/1994 | Barabash et al. | ............... | 718/102 |
| 5,361,362 A * | 11/1994 | Benkeser et al. | ............... | 718/102 |
| 5,371,887 A * | 12/1994 | Yoshida et al. | ............... | 718/107 |
| 5,528,513 A * | 6/1996 | Vaitzblit et al. | ............... | 718/103 |
| 5,539,893 A * | 7/1996 | Thompson et al. | ............... | 711/122 |
| 5,764,992 A * | 6/1998 | Kullick et al. | ............... | 717/170 |
| 5,884,077 A * | 3/1999 | Suzuki | ............... | 718/105 |
| 5,916,307 A * | 6/1999 | Piskiel et al. | ............... | 719/314 |
| 5,935,190 A * | 8/1999 | Davis et al. | ............... | 701/119 |
| 5,978,832 A * | 11/1999 | Sirkin | ............... | 718/107 |
| 6,009,452 A * | 12/1999 | Horvitz | ............... | 718/102 |
| 6,145,062 A * | 11/2000 | Chittor et al. | ............... | 711/154 |
| 6,185,615 B1 * | 2/2001 | Labiaga et al. | ............... | 709/224 |
| 6,189,022 B1 * | 2/2001 | Binns | ............... | 718/100 |
| 6,363,411 B1 * | 3/2002 | Dugan et al. | ............... | 709/202 |
| 6,385,637 B1 * | 5/2002 | Peters et al. | ............... | 718/107 |
| 6,430,593 B1 * | 8/2002 | Lindsley | ............... | 718/103 |
| 6,505,229 B1 * | 1/2003 | Turner et al. | ............... | 718/107 |
| 6,553,400 B1 * | 4/2003 | Fukuda | ............... | 718/100 |
| 6,757,897 B1 * | 6/2004 | Shi et al. | ............... | 718/102 |
| 6,785,889 B1 * | 8/2004 | Williams | ............... | 718/104 |

(Continued)

OTHER PUBLICATIONS

Rabani, Yuval. "Lecture 2, Algoritms for a Single Machine." 236605 Advanced Topics, Spring Semester 2000. Mar. 16, 2000.*

(Continued)

Primary Examiner—Lewis A. Bullock, Jr.

(57) ABSTRACT

A method, system and computer readable storage medium for executing a set of tasks. The method includes selecting an incomplete task in the set and then either starting its execution (if it was not previously suspended) or resuming its execution (if it was previously suspended). An execution timer is also started. If the selected task completes before expiry of the execution timer, the selection process is reinitiated; otherwise, the selected task is suspended, and the selection process is reinitiated. In this way, processing of a lengthy or lower-priority task can be pre-empted by processing of a shorter or higher-priority task. The method may also involve recognizing that a new version of an existing task already in the task set has been added thereto. In such a case, the older version is removed from the task set even if it is not yet complete.

9 Claims, 6 Drawing Sheets

U.S. PATENT DOCUMENTS

| | | | | |
|---|---|---|---|---|
| 6,820,263 | B1* | 11/2004 | Klappholz | 718/108 |
| 6,854,018 | B1* | 2/2005 | Li et al. | 709/240 |
| 2001/0047382 | A1* | 11/2001 | Sachedina et al. | 709/104 |
| 2002/0078121 | A1* | 6/2002 | Ballantyne | 709/102 |
| 2002/0103990 | A1* | 8/2002 | Potash | 712/215 |
| 2002/0147758 | A1* | 10/2002 | Lee | 709/102 |

OTHER PUBLICATIONS

Sevcik, Kenneth C. "Application Scheduling and Processor Allocation in Multiprogrammed Parallel Processing Systems." Technical Report CSRI-282. Computer Systems Research Institute, University of Toronto. Mar. 1993.*

Chekuri, C. et al. "Approximation Techniques for Average Completion Time Scheduling." ACM. Symposium on Discrete Algorithms. 1997.*

* cited by examiner

Fig. 3A: Evolution of task list 140 and activity of task scheduler 130 and task processor 150

| TIME (ms) | Task scheduler activity | Task processor activity (all execution intervals = 5 ms) | State of task set immediately after TIME |
|---|---|---|---|
| 0 | T1 (duration 3) added to task set | T1 selected (210)<br>Execution timer reset (220)<br>T1 begun (230) | T1 (0/3) |
| 1 | -- | T1 ongoing (230) | T1 (1/3) |
| 2 | T2 (duration 16) added to task set | T1 ongoing (230) | T1 (2/3); T2 (0/16) |
| 3 | -- | T1 completed and removed from task set (250)<br>T2 selected (210)<br>Execution timer reset (220)<br>T2 begun (230) | T2 (0/16) |
| 4 | -- | T2 ongoing (230) | T2 (1/16) |
| 5 | -- | T2 ongoing (230) | T2 (2/16) |
| 6 | -- | T2 ongoing (230) | T2 (3/16) |
| 7 | -- | T2 ongoing (230) | T2 (4/16) |
| 8 | -- | T2 context saved (265)<br>T2 suspended (270)<br>T2 selected (210)<br>Execution timer reset (220)<br>T2 resumed upon restoring T2 context (230) | T2 (5/16) |
| 9 | -- | T2 ongoing (230) | T2 (6/16) |
| 10 | T3 (duration 13) added to task set | T2 ongoing (230) | T2 (7/16); T3 (0/13) |
| 11 | T4 (duration 4) added to task set | T2 ongoing (230) | T2 (8/16); T3 (0/13); T4 (0/4) |
| 12 | -- | T2 ongoing (230) | T2 (9/16); T3 (0/13); T4 (0/4) |
| 13 | -- | T2 context saved (265)<br>T2 suspended (270)<br>T3 selected (210)<br>Execution timer reset (220)<br>T3 begun (230); | T2 (10/16); T3 (0/13); T4 (0/4) |
| 14 | -- | T3 ongoing (230) | T2 (10/16); T3 (1/13); T4 (0/4) |
| 15 | -- | T3 ongoing (230) | T2 (10/16); T3 (2/13); T4 (0/4) |
| 16 | -- | T3 ongoing (230) | T2 (10/16); T3 (3/13); T4 (0/4) |
| 17 | -- | T3 ongoing (230) | T2 (10/16); T3 (4/13); T4 (0/4) |
| 18 | -- | T3 context saved (265)<br>T3 suspended (270)<br>T4 selected (210)<br>Execution timer reset (220<br>T4 begun (230) | T2 (10/16); T3 (5/13); T4 (0/4) |

Fig. 3B: Evolution of task list 140 and activity of task scheduler 130 and task processor 150

| TIME (ms) | Task scheduler activity | Task processor activity (all execution intervals = 5 ms) | State of task set immediately after TIME |
|---|---|---|---|
| 19 | -- | T4 ongoing (230) | T2 (10/16); T3 (5/13); T4 (1/4) |
| 20 | -- | T4 ongoing (230) | T2 (10/16); T3 (5/13); T4 (2/4) |
| 21 | -- | T4 ongoing (230) | T2 (10/16); T3 (5/13); T4 (3/4) |
| 22 | -- | T4 completed and removed from task set (250) T3 selected (210) Execution timer reset (220) T3 resumed upon restoring T3 (230) | T2 (10/16); T3 (5/13) |
| 23 | -- | T3 ongoing (230) | T2 (10/16); T3 (6/13) |
| 24 | -- | T3 ongoing (230) | T2 (10/16); T3 (7/13) |
| 25 | -- | T3 ongoing (230) | T2 (10/16); T3 (8/13) |
| 26 | -- | T3 ongoing (230) | T2 (10/16); T3 (9/13) |
| 27 | -- | T3 context saved (265) T3 suspended (270) T2 selected (210) Execution timer reset (220) T2 resumed upon restoring T2 context (230) | T2 (10/16); T3 (10/13) |
| 28 | -- | T2 ongoing (230) | T2 (11/16); T3 (10/13) |
| 29 | -- | T2 ongoing (230) | T2 (12/16); T3 (10/13) |
| 30 | -- | T2 ongoing (230) | T2 (13/16); T3 (10/13) |
| 31 | -- | T2 ongoing (230) | T2 (14/16); T3 (10/13) |
| 32 | -- | T2 context saved (265) T2 suspended (270) T3 selected (210) Execution timer reset (220) T3 resumed upon restoring T3 context (230) | T2 (15/16); T3 (10/13) |
| 33 | -- | T3 ongoing (230) | T2 (15/16); T3 (11/13) |
| 34 | -- | T2 ongoing (230) | T2 (15/16); T3 (12/13) |
| 35 | -- | T3 completed and removed from task set (250) T2 selected (210) Execution timer reset (220) T2 resumed upon restoring T2 context (230) | T2 (15/16) |
| 36 | -- | T2 completed and removed from task set (250) Selection not possible (210) | Empty |

Fig. 4A: Evolution of task list 140 and activity of task scheduler 130 and task processor 150

| TIME (ms) | Task scheduler activity | Task processor activity (all execution intervals = 5 ms) | State of task set immediately after TIME |
|---|---|---|---|
| 0 | T1 (duration 3) added to task set | T1 selected (210)<br>Execution timer reset (220)<br>T1 begun (230) | T1 (0/3) |
| 1 | -- | T1 ongoing (230) | T1 (1/3) |
| 2 | T2 (duration 11) added to task set | T1 ongoing (230) | T1 (2/3); T2 (0/11) |
| 3 | -- | T1 completed and removed from task set (260)<br>T2 selected (210)<br>Execution timer reset (220)<br>T2 begun (230) | T2 (0/11) |
| 4 | -- | T2 ongoing (230) | T2 (1/11) |
| 5 | -- | T2 ongoing (230) | T2 (2/11) |
| 6 | -- | T2 ongoing (230) | T2 (3/11) |
| 7 | -- | T2 ongoing (230) | T2 (4/11) |
| 8 | -- | T2 context saved (265)<br>T2 suspended (270)<br>T2 selected (210)<br>Execution timer reset (220)<br>T2 resumed upon restoring T2 context (230) | T2 (5/11) |
| 9 | -- | T2 ongoing (230) | T2 (6/11) |
| 10 | T3 (duration 13) added to task set | T2 ongoing (230) | T2 (7/11); T3 (0/13) |
| 11 | T2$_{new}$ (duration 11) added to task set | T2$_{old}$ ongoing (230) | T2$_{old}$ (8/11); T3 (0/13); T2$_{new}$ (0/11) |
| 12 | -- | T2$_{old}$ ongoing (230) | T2$_{old}$ (9/11); T3 (0/13); T2$_{new}$ (0/11) |
| 13 | -- | T2$_{old}$ context saved (265)<br>T2$_{old}$ suspended (270)<br>T2$_{old}$ removed (280)<br>T3 selected (210)<br>Execution timer reset (220)<br>T3 begun upon restoring T3 context (230) | T2 (0/11); T3 (0/13) |
| 14 | -- | T3 ongoing (230) | T2 (0/11); T3 (1/13) |
| 15 | -- | T3 ongoing (230) | T2 (0/11); T3 (2/13) |
| 16 | -- | T3 ongoing (230) | T2 (0/11); T3 (3/13) |
| 17 | -- | T3 ongoing (230) | T2 (0/11); T3 (4/13) |
| 18 | -- | T3 context saved (265)<br>T3 suspended (270)<br>T2 selected (210)<br>Execution timer reset (220)<br>T2 begun (230) | T2 (0/11); T3 (5/13) |

Fig. 4B: Evolution of task list 140 and activity of task scheduler 130 and task processor 150

| TIME (ms) | Task scheduler activity | Task processor activity (all execution intervals = 5 ms) | State of task set immediately after TIME |
|---|---|---|---|
| 19 | — | T2 ongoing (230) | T2 (1/11); T3 (5/13) |
| 20 | — | T2 ongoing (230) | T2 (2/11); T3 (5/13) |
| 21 | — | T2 ongoing (230) | T2 (3/11); T3 (5/13) |
| 22 | — | T2 ongoing (230) | T2 (4/11); T3 (5/13) |
| 23 | — | T2 context saved (265) T2 suspended (270) T3 selected (210) Execution timer reset (220) T3 resumed upon restoring T3 context (230) | T2 (5/11); T3 (5/13) |
| 24 | — | T3 ongoing (230) | T2 (5/11); T3 (6/13) |
| 25 | — | T3 ongoing (230) | T2 (5/11); T3 (7/13) |
| 26 | — | T3 ongoing (230) | T2 (5/11); T3 (8/13) |
| 27 | — | T3 ongoing (230) | T2 (5/11); T3 (9/13) |
| 28 | — | T3 context saved (265) T3 suspended (270) T2 selected (210) Execution timer reset (220) T2 resumed upon restoring T2 context (230) | T2 (5/11); T3 (10/13) |
| 29 | — | T2 ongoing (230) | T2 (6/11); T3 (10/13) |
| 30 | — | T2 ongoing (230) | T2 (7/11); T3 (10/13) |
| 31 | — | T2 ongoing (230) | T2 (8/11); T3 (10/13) |
| 32 | — | T2 ongoing (230) | T2 (9/11); T3 (10/13) |
| 33 | — | T2 context saved (265) T2 suspended (270) T3 selected (210) Execution timer reset (220) T3 resumed upon restoring T3 context (230) | T2 (10/11); T3 (10/13) |
| 34 | — | T3 ongoing (230) | T2 (10/11); T3 (11/13) |
| 35 | — | T3 ongoing (230) | T2 (10/11); T3 (12/13) |
| 36 | — | T3 completed and removed from task set (250) T2 selected (210) Execution timer reset (220) T2 resumed upon restoring T2 context (230) | T2 (10/11) |
| 37 | — | T2 completed and removed from task set (250) Selection not possible (210) | Empty |

METHOD AND SYSTEM FOR EXECUTING MULTIPLE TASKS IN A TASK SET

FIELD OF THE INVENTION

The present invention relates to execution of multiple tasks by a task processing element and, in particular, to a method and system for executing multiple tasks as part of a communications protocol, such as a routing protocol.

BACKGROUND OF THE INVENTION

In order for a router to participate in a routing protocol with one or more neighbouring nodes, the router must be capable of responding to messages received from those neighbouring nodes. Depending on the type of received message, different types of tasks will be scheduled for execution by a central processing unit (CPU) within the router. For instance, some messages will require a timely response to the sender in order to show that the router is functioning properly. Other received messages, such as network topology updates, do not require a speedy response to be issued but instead may require a large background processing job to be initiated by the CPU.

If the router is currently in the process of receiving a message of the former type, i.e., requiring a timely response, but the CPU is busy handling a previously received message that has initiated a lengthy background processing job, then the router will temporarily be unable to respond to the currently received message. Under such circumstances, tasks associated with responding to the currently received message will be added to a set of tasks (e.g., in the form of a list) that shall be performed by the CPU as soon as it is free to do so. As tasks are completed, they are removed from the set of tasks or otherwise marked as complete.

Consequently, the set of incomplete tasks grows and shrinks dynamically, depending on the rate of arrival of new messages and also depending on the rate at which previously received messages can be processed by the CPU. Whether the router can respond in a timely fashion to all time-critical messages that may be received is a function of several factors, including the number of tasks in the task set, the average number of CPU cycles needed to execute a task in the task set and the processing power of the CPU itself.

Typically, the average number of CPU cycles per task is determined by the routing protocol being run by the router, while the processing speed of the CPU is bounded above by the state of CPU technology at the time the router was designed or manufactured. Hence, for a given routing protocol and a given CPU processing speed, the responsiveness of a router will depend chiefly on the number of tasks in the task set, which is a function of the rate at which received messages are received. Since the rate of received messages is a function of the number of neighbour nodes with which the router may exchange information via a set of communication ports, it follows that the ability of a router to respond in a timely fashion to received messages is proportional to the number of communication ports in use.

In conventional routers, for a given routing protocol (such as OSPF, for example), the CPU is sufficiently fast and the number of ports sufficiently low (e.g., 8 to 16) to allow the router to respond to most received messages in a timely fashion. However, a significant increase in the number of ports (e.g., to several thousand or more) would result in a severe drop in responsiveness of conventional routers given their present-day design. This would lead to a greater proportion of time-critical messages not being responded to within a maximum acceptable delay, which would cause neighbouring nodes to assume that the router is not alive. This, in turn, would cause the emission of even more messages by the neighbouring nodes, which would not only cause more tasks to be added to the ever-growing task set, but would consume valuable network bandwidth as well.

Clearly, it would be advantageous to provide a router with the capability of responding to time-critical messages as the router is scaled to a large number of ports, without having to redesign the routing protocol or wait for future advances in CPU performance.

SUMMARY OF THE INVENTION

The present invention endeavours to solve this problem by providing a method of executing a set of tasks, which operates on a principle of controlled task suspension. The method begins by selecting an incomplete task in the set and either starting its execution (if it was not previously suspended) or resuming its execution (if it was previously suspended) An execution timer is also started. If the selected task completes before expiry of the execution timer, the selection process is reinitiated. If the selected task is not complete by the time the execution timer expires, then the selected task is suspended, and the selection process is reinitiated.

Clearly, if at the time of suspending the selected task, there is no other incomplete task in the set, then the selected task is automatically re-selected and resumed. However, if there is at least one other incomplete task in the set (i.e., if there is a total of at least two incomplete tasks in the set), then the selection process may be based on a criterion, such as: how recently each task has become a member of the set; an expected duration for each task; a priority associated with each task; the number of times that each task has been previously suspended; or how long ago each task was first suspended. A random function could also be used in the selection process.

In this way, processing of a lengthy or lower-priority task can be pre-empted by processing of a shorter or higher-priority task, the completion of which may be required in order to allow the router to respond in a timely fashion to certain types of messages in the context of a routing protocol.

The method may also involve recognizing that a new version of an existing task already in the task set has been added thereto. In such a case, the older version is removed from the task set even if it is not yet complete. Such purging action has the advantage of allowing more efficient processing of the remaining incomplete tasks in the task set.

Therefore, according to a broad aspect, the invention provides a method of executing a set of at least one incomplete task. The method includes selecting an incomplete task from the set; resetting an execution timer having an expiry condition; advancing execution of the selected task until the earlier of (i) completion of the selected task and (ii) expiry of the execution timer; and upon expiry of the execution timer prior to completion of the selected task, suspending execution of the selected task.

The invention may be embodied in a processor readable medium containing a software program comprising instructions for a processor to implement the above method. Furthermore, the invention may be embodied in a processing platform programmed for implementing the above method.

According to another broad aspect, the invention may be summarized as an apparatus, including a memory for storing a task set; a task scheduler for adding incomplete tasks to the task set; and a task processor for executing incomplete tasks in the task set by selecting an incomplete task from the set; resetting an execution timer having an expiry condition; advancing execution of the selected task until the earlier of (i) completion of the selected task and (ii) expiry of the execution timer; and upon expiry of the execution timer prior to completion of the selected task, suspending execution of the selected task.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIGS. 3A and 3B illustrate an example chronology of task processor activity and evolution of the task set, when the algorithm of FIG. 2 is used; and FIGS. 4A and 4B illustrate an example chronology of task processor activity and evolution of the task set, when a variation of the algorithm of FIG. 2 is used.

DETAILED DESCRIPTION OF THE PREFERRED EMBODIMENTS

Figure 1:
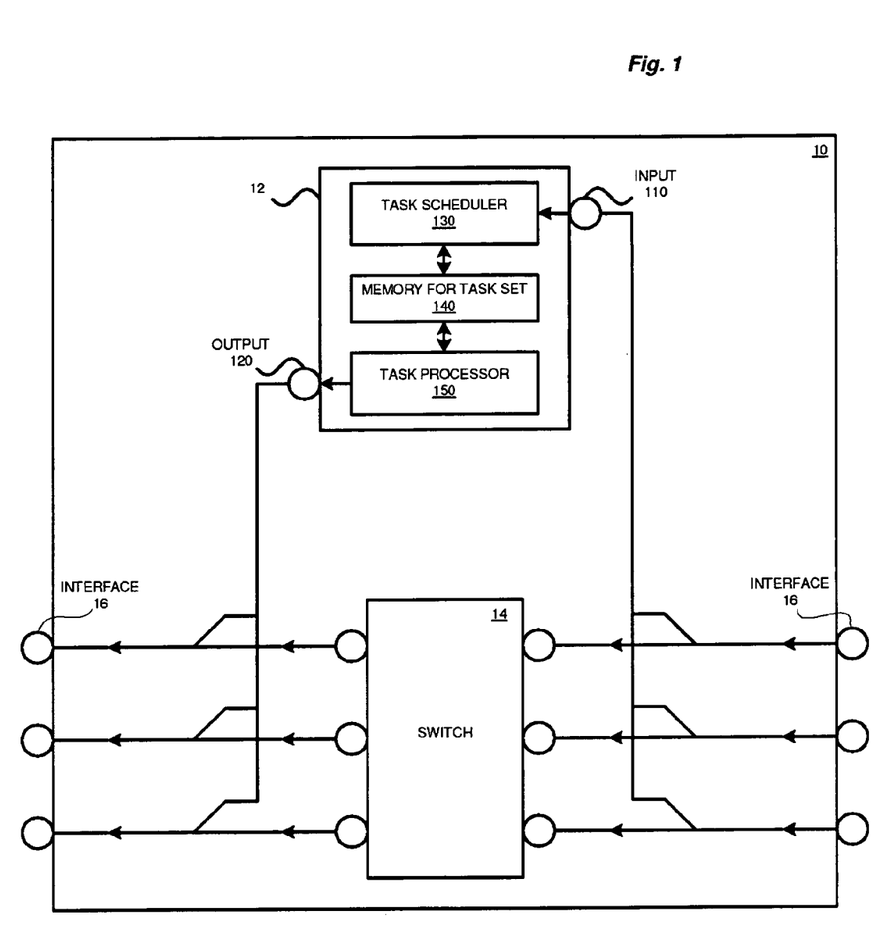
FIG. 1 shows, in block diagram form, a device equipped with a task scheduler for adding tasks to a task set and a task processor for processing tasks in the task set.

With reference to FIG. 1, there is shown a router control processing module 12 forming part of a router 10 that also has a switching entity 14. The router control processing module 12 is adapted to enable the router 10 to participate in a routing protocol with other routers and neighbouring nodes to which the router 10 is connected via a plurality of interfaces 16 (also referred to as "ports"). In the illustrated embodiment, not to be taken as limiting, the router control processing module 12 includes an input entity 110, an output entity 120, a task scheduler 130, a memory for storing a task set 140, and a task processor 150. In one embodiment, the memory for storing the task set 140 is accessible by both the task scheduler 130 and the task processor 150. In specific non-limiting example embodiments, the task set 140 may take the form of a list, a buffer, a linked list, a database, a list of pointers to a database, etc.

The task scheduler 130 comprises suitable circuitry, software and/or control logic for receiving, decoding and/or recognizing messages received from neighbouring nodes at the input entity 110 of the control processing module 12. The input entity 110 may simply consist of a port, or it may include additional hardware and/or software functional elements. Messages received from neighbouring nodes may include messages required to allow the router 10 to actively participate in one or more routing protocols. The types of messages that may be received include time-critical messages (i.e., requiring a timely response), as well as non-time-critical messages that do not necessarily require a rapid response but instead require processing to be performed to varying levels of intensity.

The task scheduler 130 comprises suitable circuitry, software and/or control logic for adding one or more tasks to the task set 140 corresponding to each type of received message In addition, the task scheduler 130 may be adapted to add tasks to the task set 140 as a function of an internal mechanism such as a timer. Thus, the addition of tasks to the task set 140 by the task scheduler 130 may be event-driver, synchronized, asynchronous or a combination thereof.

By way of example, the routing protocol may be BGP4 (Border Gateway Protocol, version 4), OSPF (Open Shortest Path First) or IS-IS (Intermediate System to Intermediate System). An example of a time-critical message is an OSPF "Hello" packet. An example of a non-time-critical message is an OSPF Link State Advertisement (LSA) update. An example of a task associated with a time-critical message includes a response to an OSPF hello message. An example of a task associated with a non-time-critical message includes an OSPF LSA linked list update. An example of a task not associated with a given received message includes the OSPF algorithm itself.

The task processor 150 comprises a central processing unit (CPU) and any other suitable circuitry, software and/or control logic required for accessing the task set 140, causing the execution of individual tasks in the task set 140 and either removing tasks from the task set 140 upon their completion or marking them as complete. In order to avoid situations such as the one in which execution of a first task would delay execution of a second task to a point beyond which the delay would cause a neighbouring node to conclude that the router 10 is malfunctioning, the task processor 150 runs a task processing algorithm that is now described with reference to FIG. 2.

Figure 2:
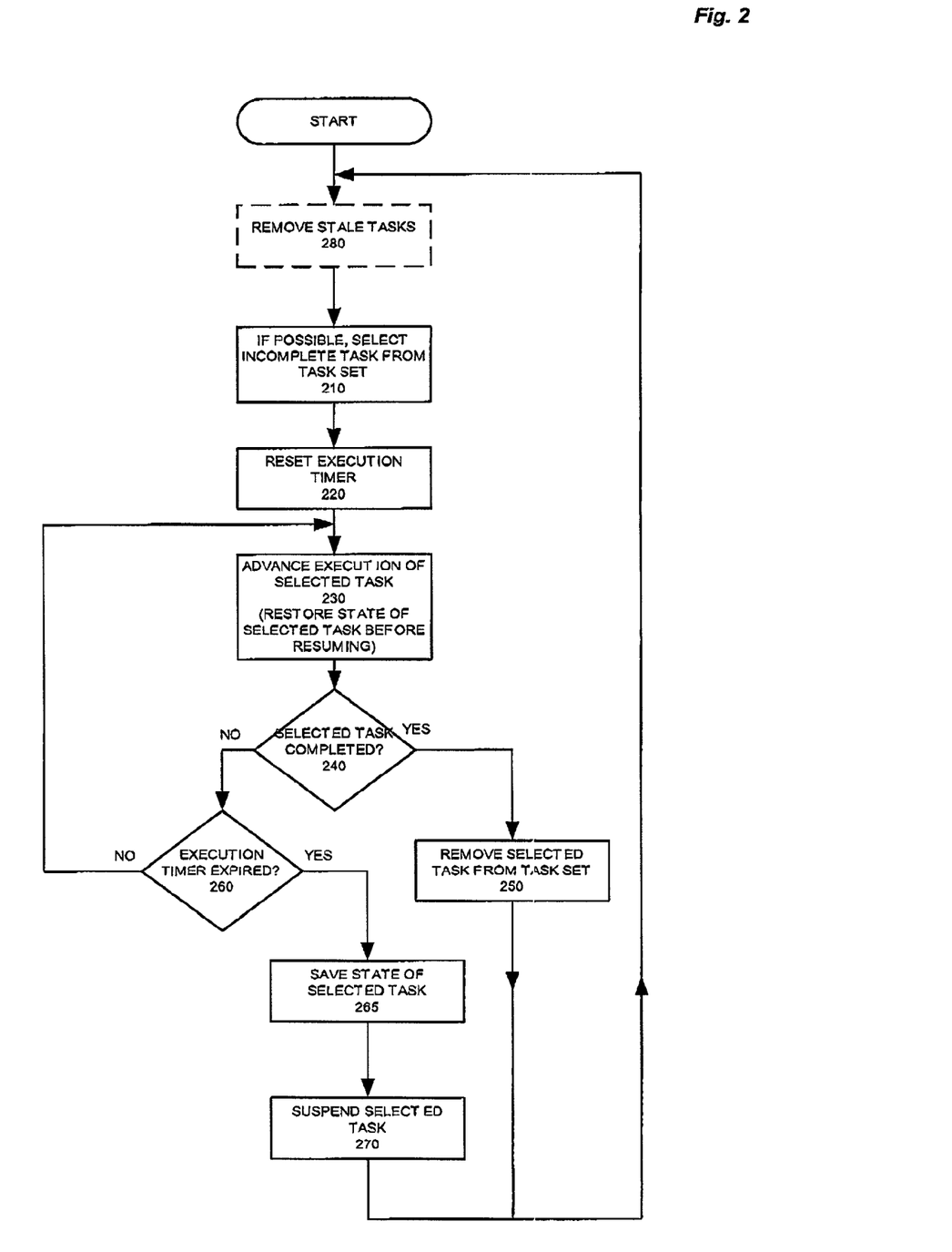
FIG. 2 shows operational steps in a task processing algorithm executed by the task processor, in accordance with an embodiment of the present invention.

Specifically, the task processing algorithm begins at step 210 by selecting an incomplete task from the task set. This may be achieved on the basis of a criterion, such as how recently each task has become a member of the set, an expected duration for each task, a priority associated with each task, the number of times that each task has been previously suspended or how long ago each task was first suspended. Still other criteria may be used to aid in selection of the next incomplete task to be advanced towards completion.

Once an incomplete task is selected from the task set, the task processing algorithm proceeds to step 220, where an execution timer is reset. The execution timer has an associated expiry condition. The expiry condition may be a pre-determined period of time (e.g., microseconds, milliseconds, etc.) or a pre-determined number of clock cycles. In other embodiments, the expiry condition may be a pre-determined degree or increment of completion of the selected task. In any event, execution of the selected task continues until either the execution timer expires or the selected task is completed, whichever comes first.

At step 230, following resetting of the execution timer, execution of the selected task is advanced Of course, in the alternative, the execution timer could be reset slightly after the commencement of execution of the selected task at step 230. The task processor 150 will have knowledge of whether each task in the set of tasks has been previously suspended or is a new task. This knowledge may be gained from the task set itself, which may contain a "level of completeness" field associated with each task, which indicates the decree to which the task in question has been completed. For example, if the level of completeness of a particular task is zero, this would be indicative of the particular task being a "new" task.

In the case where the selected task has been suspended at least once before, advancing execution of the task signifies resuming execution of the selected task, so that the task is brought closer to completion. If, on the other hand, the selected task is a new task (i.e., it has never before been suspended), advancing execution of the selected task signifies beginning execution of the task.

In FIG. 2, steps 240 through 270 indicate that execution of the selected task continues until the earlier of (i) completion of the selected task or (ii) expiry of the execution timer. Accordingly, during execution, step 240 consists of verifying whether the selected task has finished. This knowledge may be gained from the task set by consulting the "level of completeness" field associated with the selected task. Alternatively, this knowledge may be gained by monitoring a globally accessible variable which is modified upon completion of the selected task.

If step 240 reveals that selected task has indeed completed, then, at step 250, the selected task is removed from the task set 140. Removal of the completed task from the task set 140 may be performed directly by the task processor 150. Alternatively, the task processor 150 may issue a command to the task scheduler 130, which may itself effect removal of the task from the task set 140. Following removal of the completed task from the task set 140, the task processing algorithm returns to step 210, where the selection of an incomplete task is performed de novo. It should be appreciated that removal of a completed task from the task set 140 is an optional step. It is within the scope, of the present invention for a completed task to reman in the task set 140, but to indicate in the "level of completeness" field that the task is 100% complete. This ensures that they will not be considered as incomplete tasks during the following pass through step 210.

On the other hand, if step 240 reveals that the selected task has not yet terminated, then the task processing algorithm proceeds to step 260, where it is determined whether the execution timer has expired. If the execution timer has not expired, the task processing algorithm returns to step 230, where execution of the selected task is further advanced towards completion. However, if the execution timer has indeed expired, then the task processing algorithm proceeds to step 265, where the task state and/or CPU state (more generally, the "context") is saved. This is followed by step 270, where the selected task is suspended. Subsequently, the task processing algorithm returns to step 210, where an incomplete task is again selected from those tasks in the task set 140 that are incomplete.

The above-described behaviour allows each task to be at least partially executed within a relatively short time after being added to the task set 140, despite the fact that the task processor 150 may have bee:n busy performing another task at the time the task was added to the task set 140. Since time-critical messages tend to be associated with shorter tasks, it should therefore be appreciated that the task processor 150 enables the router to handle time-critical messages, even if the task processor 150 has a large amount of background processing to perform.

This advantageous behaviour may be better understood with reference now to a specific example, illustrated in FIGS. 3A and 3B, wherein is shown an example chronology involving the addition of tasks by the task scheduler 130, the activity of the task processor 150 (in accordance with the task processing algorithm of FIG. 2) and the state of the task set 140, at various times. It is assumed that the task set 140 is empty prior to TIME=0 ms.

At TIME=0 ms, the task scheduler 130 adds task T1 to the task set 140. This may be prompted by receipt of a message or through an internal mechanism. It should be appreciated that task T1 (as is the case with each other task) will, of course, have a duration, but the task scheduler 130 does not necessarily know, in advance, the duration of any particular task. (In this particular example, the duration of task T1 is 3 ms and it is assumed, for purposes of illustration, that the task scheduler 130 does not know this fact when adding it to the task set 140.) As part of the task processing algorithm, the task processor 150 executes step 210, whereby it selects T1 as the task to start executing, which is the only task currently in the task set 140. The task processor 150 also resets the execution timer at step 220. (In this particular example, the execution timer has a fixed duration of 5 ms.) Also, at step 230, the task processor 150 begins execution of the selected task which, in this case, is task T1.

At TIME=1 ms, task T1 is not complete and the execution timer has not expired. Therefore, at step 230, the task processor 150 continues execution of task T1.

At TIME=2 ms, task T1 is not complete and the execution timer has not expired. Therefore, at step 230, the task processor 150 continues execution of task T1. Meanwhile, the task scheduler 130 adds a second task, T2, to the task set 140. The duration of task T2 is 16 ms, but this fact may not be known in advance to the task scheduler 130 or task processor 150. The state of the task set 140 at TIME=2 ms is that it contains task T1 (which is $\frac{2}{3}$ of the way to completion) and task T2 (which has not yet been started).

At TIME=3 ms, task T1 is complete and, as a result, the task processor 150 executes step 250 to remove task T1 from the task set (or otherwise signal Completion of the task T1). Since the only other task in the task set 140 is task T2, the task processor 150 has no difficulty in selecting, at step 210, task T2 as the next task to be started. At step 220, the task processor 150 resets the execution timer and, at step 230, begins execution of task T2.

At TIME=4 ms, task T2 is not complete and the execution timer has not expired. Therefore, at step 230, the task processor 150 continues execution of task T2.

At TIME=5 ms, task T2 is not complete and the execution timer has not expired. Therefore, at step 230, the task processor 150 continues execution of task T2.

At TIME=6 ms, task T2 is not complete and the execution timer has not expired. Therefore, at step 230, the task processor 150 continues execution of task T2.

At TIME=7 ms, task T2 is not complete and the execution timer has not expired. Therefore, at step 230, the task processor 150 continues execution of task T2.

At TIME=8 ms, task T2 is still executing but the execution timer has expired. Consequently, at step 265, the task processor 150 saves the state of task T2 and, at step 270, suspends task T2. The task processor 150 then verifies the task set 140 and determines that task T2 is the only task in the task set 140. Thus, the task processor 150 has no difficulty in selecting, at step 210, task T2 as the next task to be furthered towards completion. At step 220, the task processor 150 resets the execution timer and, at step 230, restores the state of task T2 and resumes execution of this task.

At TIME=9 ms, task T2 is not complete and the execution timer has not expired. Therefore, the task processor 150, at step 230, continues execution of task T2.

At TIME=10 ms, task T2 is not complete and the execution timer has not yet expired. Therefore, at step 230, the task processor 150 continues execution of task T2. Meanwhile, the task scheduler 130 adds another task, T3, to the task set 140. The duration of task T3 is 13 milliseconds, but this fact may not be known in advance to the task scheduler 130 or to the task processor 150. The state of the task set 140 at TIME=10 ms is such that it contains task T2 (which is $\frac{7}{16}$ of the way to completion) and task T3 (which has not yet been started).

At TIME=11 ms, task T2 is not complete and the execution timer has not expired. Therefore, at step 230, the task processor 150 continues execution of task T2. Meanwhile, the task scheduler 130 adds yet another task, T4, to the task set 140. The duration of task T4 is 4 ms, but this fact may not be known in advance to the task scheduler 130 or to the task processor 150. The state of the task set 140 at TIME=11 ms is such that it contains task T2 (which is 8/16 of the way to completion), task T3 (which has not yet been started) and task T4 (also not yet started).

At TIME=12 ms, task T2 is not complete and the execution timer has not expired. Therefore, at step 230, the task processor 150 continues execution of task T2.

At TIME=13 ms, task T2 is still executing but the execution timer has now expired. Consequently, the task processor 150 saves the state of task T1 at step 265 and suspends task T2 at step 270. The task processor 150 then verifies the task set 140 and determines that the task set 140 contains tasks T2, T3 and T4. The task processor 150 executes step 210, consisting of selecting one of the tasks in the task set 140 for which processing shall be advanced. Since there is more than one incomplete task in the task set 14C, the selection process takes place. The selection process is based on a criterion, such as how recently each task has become a member of the task set 140, an expected duration for each task, a priority associated with each task, the number of times that each task has been previously suspended, how long ago each task was first suspended or even a random number.

In this particular case, the applied criterion is the number of times that each task has previously been suspended. Thus, the selected task will be the one which has been suspended the least number of times; if two or more tasks have been suspended the least number of times, then the order in which each task became a member of the task set 140 is considered to be the selection criterion. Considering the tasks currently in the task set 140 at TIME=13 ms, it is noted that both tasks T3 and T4 have been suspended the least number of times (i.e., zero). However, task T3 joined the task set 140 prior to task T4 and thus the step of selecting a task at step 210 will result in selection of task T3 as the next task to be advanced towards completion. At step 220, the task processor 150 resets the execution timer and, at step 230, begins execution of task T3.

At TIME=14 ms, task T3 is not complete and the execution timer has not expired. Therefore, at step 230, the task processor 150 continues execution of task T3.

At TIME=15 ms, task T3 is not complete and the execution timer has not expired. Therefore, at step 230, the task processor 150 continues execution of task T3.

At TIME=16 ms, task T3 is not complete and the execution timer has not expired. Therefore, at step 230, the task processor 150 continues execution of task T3.

At TIME=17 ms, task T3 is not complete and the execution timer has not expired. Therefore, at step 230, the task processor 150 continues execution of task T3.

At TIME=18 ms, task T3 is still executing but the execution timer has expired. Consequently, at step 265, the task processor 150 saves the state of task T3 and, at step 270, suspends this task. The task processor 150 then verifies the task set 140 and determines that the task set 140 contains tasks T2, T3 and T4. The task processor 150 executes step 210, consisting of selecting one of the tasks in the task set 140 for which processing shall be advanced. Applying the same criterion as before, it is noted that task T4 has been suspended the least number of times (i.e., zero). Therefore, the step of selecting a task at step 210 will result in selection of task T4 as the next task to be advanced towards completion. At step 220, the task processor 150 resets the execution timer and, at step 230, begins execution of task T4.

At TIME=19 ms, task T4 is not complete and the execution timer has not expired. Therefore, at step 230, the task processor 150 continues execution of task T4.

At TIME=20 ms, task T4 is not complete and the execution timer has not expired. Therefore, at step 230, the task processor 150 continues execution of task T4.

At TIME=21 as, task T4 is not complete and the execution timer has not expired. Therefore, at step 230, the task processor 150 continues execution of task T4.

At TIME=22 ms, task T4 is complete and, as a result, the task processor 150 executes step 250 to remove task T4 from the task set 140. The task set 140 now contains only tasks T2 and T3. The task processor 150 executes step 210, consisting of selecting one of the tasks in the task set 140 for which processing shall be advanced. Applying the same criterion as before, it is noted that task T3 has been suspended the least number of times (i.e., once). Therefore, the step of selecting a task at step 210 will result in selection of task T3 as the next task to be advanced towards completion. At step 220, the task processor 150 resets the execution timer and, at step 230, restores the state of task T3 and resumes execution of this task.

At TIME=23 ms, task T3 is not complete and the execution timer has not expired. Therefore, at step 230, the task processor 150 continues execution of task T3.

At TIME=24 ms, task T3 is not complete and the execution timer has not expired. Therefore, at step 230, the task processor 150 continues execution of task T3.

At TIME=25 ms, task T3 is not complete and the execution timer has not expired. Therefore, at step 230, the task processor 150 continues execution of task T3.

At TIME=26 ms, task T3 is not complete and the execution timer has not expired. Therefore, at step 230, the task processor 150 continues execution of task T3.

At TIME=27 ms, task T3 is still executing but the execution timer has now expired. Consequently, the task processor 150 saves the state of task T3 and step 265 and suspends this task T3 at step 270. The task processor 150 then verifies the task set 140 and determines that it contains tasks T2 and T3. Applying the game criterion as before, it is noted that both tasks T2 and T3 have been suspended the same number of times (i.e., twice). However, task T2 joined the task set 140 prior to task T3 and thus the step of selecting a task at step 210 will result in selection of task T2 as the next task to be advanced towards completion. At step 220, the task processor 150 resets the execution timer and, at step 230, restores the state of task T2 and resumes execution of this task.

At TIME=28 ms, task T2 is not complete and the execution timer has not expired. Therefore, at step 230, the task processor 150 continues execution of task T2.

At TIME=29 ms, task T2 is not complete and the execution timer has not expired. Therefore, at step 230, the task processor 150 continues execution of task T2.

At TIME=30 ms, task T2 is not complete and the execution timer has not expired. Therefore, at step 230, the task processor 150 continues execution of task T2.

At TIME=31 ms, task T2 is not complete and the execution timer has not expired. Therefore, at step 230, the task processor 150 continues execution of task T2.

At TIME =32 ms, task T2 is still executing but the execution timer has expired. Consequently, the task processor 150 saves the state of task T2 and step 265 and suspends this task at step 270. The task processor 150 then verifies the task set 140 and determines that the task set 140 contains tasks T2 and T3. Applying the same criterion as before, it is noted that task T3 has been suspended the least number of times (i.e., twice). Therefore, the step of selecting a task at step 210 will result in selection of task T3 as the next task to be advanced towards completion. At step 220, the task processor 150 resets the execution timer and, at step 230, restores the state of task T3 and resumes execution of this task.

At TIME=33 ms, task T3 is not complete and the execution timer has not expired. Therefore, at step 230, the task processor 150 continues execution of task T3.

At TIME=34 ms, task T3 is not complete and the execution timer has not expired. Therefore, at step 230, the task processor 150 continues execution of task T3.

At TIME=35 ms, task T3 is complete and, as a result, the task processor 150 executes step 250 to remove task T3 from the task set. Since the only ocher task in the task set 140 is task T2, the task processor 150 has no difficulty in selecting, at step 210, task T2 as the next task to be advanced towards completion. At step 220, the task processor 150 resets the execution timer and, at step 230, restores the state of task T2 and resumes execution of this task.

At TIME=36 ms, task T2 is complete and, as a result, the task processor 150 executes step 253 to remove task T2 from the task set 140. Since there are no other tasks in the task set 140, the task processor 150 does nothing until an incomplete task appears in the task set 140.

The above-described behaviour allows relatively short tasks (such as, e.g., tasks T1 and T4) to be executed within a relatively short time after being added to the task set, despite the fact that the task processor 150 may have been busy performing another ask at the time the task is added to the task set 140. Since time-critical messages tend to be associated with the shorter tasks, it should therefore be appreciated that the task processor 150 enables the router to handle time-critical messages, even if the task processor 150 has a large amount of background processing to perform.

It should also be appreciated that in some embodiments, the same task as one that is already in the task set 140 may re-appear in the task set 140 at a later time. For example, in the case where a routing table update is to be performed, such an updated may be required at regular or sporadic intervals. Each time a routing table update is to be performed, the most recent topological information about the network is used. Thus, a routing table update initiated at the present time will be more up-to-date than a routing table update that was begun several milliseconds ago. If, at time T, the task processor 150 is busy performing a routing table update (as the result of beginning execution of a task at a time T−τ), and if a task initiating another routing table has just appeared in the task set 140, then it is a waste of processing power for the task processor 150 to continue executing the ongoing routing table update, since it will have to spend time re-executing a routing table update upon completion of the ongoing routing table update and also since the new routing table update will supersede the ongoing routing table update.

Hence, it would be advantageous to be able to recognize when a particular task in the task set 140 is a new version of an existing task in the task set 140 and, furthermore, to remove the older (i.e., "stale") version of the task from the task set 140. Accordingly, in a variation of the task processing algorithm of FIG. 2, the task processor performs an additional step (step 280, shown in dotted outline in FIG. 2) whereby this very action is performed. Removal of the older version of the affected task may be effected by the task processor 150 either directly (by accessing the task set 140) or indirectly (via the task scheduler 130).

A specific example of this added advantageous behaviour may be better understood with reference now to FIGS. 4A and 4B, wherein is shown an example chronology involving the addition of tasks by the task scheduler 130, the activity of the task processor 150 (in accordance with the task processing algorithm of FIG. 2, including step 280) and the state of the task set 140, at various times.

It is again assumed that the task set 140 is empty prior to TIME=0 ms.

At TIME=0 ms, the task scheduler 130 adds task T1 to the task set 140. This may be prompted by receipt of a message or through an internal mechanism. It should be appreciated that task T1 (as is the case with each other task) will, of course, have a duration, but the task scheduler 130 does not necessarily know, in advance, the duration of any particular task. (In this particular example, the duration of task T1 is 3 ms and it is assumed, for purposes of illustration, that the task scheduler 130 does not know this fact when adding it to the task set 140.) As part of the task processing algorithm, the task processor 150 executes step 210, whereby it selects T1 as the task to start executing, which is the only task currently in the task set 140. The task processor 150 also resets the execution timer at step 220. (In this particular example, the execution timer has a fixed duration of 5 ms.) Also, at step 230, the task processor 150 begins execution of the selected task which, in this case, is task T1.

At TIME=1 ms, task T1 is not complete and the execution timer has not expired. Therefore, at step 230, the task processor 150 continues execution of task T1.

At TIME=2 ms, task T1 is not complete and the execution timer has not expired. Therefore, at step 230, the task processor 150 continues execution of task T1. Meanwhile, the task scheduler 130 adds a second task, T2, to the task set 140. The duration of task T2 is 11 ms, but this fact may not be known in advance to the task scheduler 130 or task processor 150. The state of the task set 140 at TIME=2 ms, is that it contains task T1 (which is ⅔ of the way to completion) and task T2 (which has not yet been started).

At TIME=3 ms, task T1 is complete and, as a result, the task processor 150 executes step 250 to remove task T1 from the task set. Since the only other task in the task set 140 is task T2, the task processor 150 has no difficulty in selecting, at step 210, task T2 as the next task to be started. At step 220, the task processor 150 resets the execution timer and, at step 230, begins execution of task T2.

At TIME=4 ms, task T2 is not complete and the execution timer has not expired. Therefore, at step 230, the task processor 150 continues execution of task T2.

At TIME=5 ms, task T2 is not complete and the execution timer has not expired. Therefore, at step 230, the task processor 150 continues execution of task T2.

At TIME=6 ms, task T2 is not complete and the execution timer has not expired. Therefore, at step 230, the task processor 150 continues execution of task T2.

At TIME=7 ms, task T2 is not complete end the execution timer has not expired. Therefore, at step 230, the task processor 150 continues execution of task T2.

At TIME=8 ms, task T2 is still executing but the execution timer has expired. Consequently, at step 265, the task processor 150 saves the state of task T2 and, at step 270 suspends this task. The task processor 150 then verifies the task set 140 and determines that task T2 is the only task in the task set 140. Thus, the task processor 150 has no difficulty in selecting, at step 210, task T2 as the next task to be furthered towards completion. At step 220, the task processor 150 resets the execution timer and, at step 230, restores the state of task T2 and resumes execution of this task.

At TIME=9 ms, task T2 is not complete and the execution timer has not expired. Therefore, the task processor 150, at step 230, continues execution of task T2.

At TIME=10 ms, task T2 is not complete and the execution timer has not yet expired. Therefore, at step 230, the task processor 150 continues execution of task T2. Meanwhile, the task scheduler 130 adds another task, T3, to the task set 140. The duration of task T3 is 13 ms, but this fact may not be known in advance to the task scheduler 130 or to the task processor 150. The state of the task set 140 at TIME=10 ms, is such that it contains task T2 (which is $7/11$ of the way to completion) and task T3 (which has not yet been started).

At TIME=11 ms, task T2 is not complete and the execution timer has not expired. Therefore, at step 230, the task processor 150 continues execution of task T2. Meanwhile, the task scheduler 130 adds a new version of task T2 to the task set 140. For example, task T2 may represent computation of a routing table, which is to be re-executed based on all new information received about the network topology since the last time the routing table was computed. The duration of the new version of task T2 is 11 ms, (as was the case with the old version of task T2); again, this fact might not be known in advance to the task scheduler 130 or task processor 150. The state of the task set 140 at TIME=11 ms is such that it contains the old version of task T2 (which is $8/11$ of the way to completion), task T3 (which has not yet been started) and the new version of task T2 (also not yet started).

At TIME=12 ms, the old version of task T2 is not complete and the execution timer has not yet expired. Therefore, at step 230, the task processor 150 continues execution of the old version of task T2.

At TIME=13 ms, the old version of task T2 is still executing but the execution timer has now expired. Consequently, at step 265, the task processor 150 saves the state of the old version of task T2 and, at step 270, suspends the old version of task T2. The task processor 150 then executes step 280 which, in this case, consists of removing the old version of task T2 from the task set 140. Next, at step 210, the task processor 150 verifies the task set 140, determines that the task set 140 contains task T2 (new version, subscript hereinafter omitted) and task T3, and selects one of these tasks as the one for which processing shall be advanced.

Since there is more than one incomplete task in the task set 140, the selection process is based on a criterion, such as a random number, or how recently each task has become a member of the task set 140, or an expected duration for each task, or a priority associated with each task, or the number of times that each task has been previously suspended or how long ago each task was first suspended, etc. In this particular case, the applied criterion is the number of times that each task has been suspended. Thus, the selected task will be the one which has been suspended the least number of times; if two or more tasks have been suspended the least number of times, then the order in which each task became a member of the task set 140 is considered to be the selection criterion.

Considering the tasks currently in the task set 140 at time 13 ms, it is noted that both task T3 and the new version of task T2 have been suspended the least number of times (i.e., zero). However, task T3 joined the task set 140 prior to the new version of task T2 and thus the step of selecting a task at step 210 will result in task T3 being selected as the next task to be advanced towards completion. At step 220, the task processor 150 resets the execution timer and, at step 230, begins execution of task T3.

At TIME=14 ms, task T3 is not complete and the execution timer has not yet expired. Therefore, at step 230, the task processor 150 continues execution of task T3.

At TIME=15 ms, task T3 is not complete and the execution timer has not expired. Therefore, at step 230, the task processor 150 continues execution of task T3.

At TIME=16 ms, task T3 is not complete and the execution timer has not expired. Therefore, at step 230, the task processor 150 continues execution of task T3.

At TIME=17 ms, task T3 is not complete and the execution timer has not expired. Therefore, at step 230, the task processor 150 continues execution of task T3.

At TIME=18 ms, task T3 is still executing but the execution timer has expired. Consequently, at step 265, the task processor 150 saves the state of task T3 and, at step 270, suspends this task. The task processor 150 then verifies the task set 140 and determines that the task set 140 contains tasks T2 and T3. The task processor 150 executes step 210, consisting of selecting one of the tasks in the task set 140 for which processing shall be advanced Applying the same criterion as before, it is noted that task T2 has teen suspended the least number of times (i.e., zero). Therefore, the step of selecting a task at step 210 will result in task T2 being chosen as the next task to be advanced towards completion. At step 220, the task processor 150 resets the execution timer and, at step 230, begins execution of (the new version of) task T2.

At TIME=19 ms, task T2 is not complete and the execution timer has not expired. Therefore, at step 230, the task processor 150 continues execution of task T2.

At TIME=20 ms, task T2 is not complete and the execution timer has not yet expired. Therefore, at step 230, the task processor 150 continues execution of task T2.

At TIME=21 ms, task T2 is not complete and the execution timer has not yet expired. Therefore, at step 25 230, the task processor 150 continues execution of task T2.

At TIME=22 ms, task T2 is not complete and the execution timer has not yet expired. Therefore, at step 30 230, the task processor 150 continues execution of task T2.

At TIME=23 ms, task T2 is still executing but the execution timer has expired. Consequently, at step 265, the task processor 150 saves the state of task T2 and, at step 270, suspends task T2. The task processor 150 then verifies the task set 140 and determines that the task set 140 contains tasks T2 and T3. The task processor 150 executes step 210, consisting of selecting one of the tasks in the task set 140 for which processing shall be advanced. Applying the same criterion as before, it is noted that both tasks T2 and T3 have been suspended once, but task T3 has been in the task set. 140 for a longer period of time than task T2. Therefore, the step of selecting a task at step 210 will result in selection of task T3 as the next task to be advanced to completion. At step 220, the task processor 150 resets the execution timer and, at step 230, restores the state of task T3 and resumes execution of this task.

At TIME=24 ms, task T3 is not; complete and the execution timer has not yet expired. Therefore, at step 230, the task processor 150 continues execution of task T3.

At TIME=25 ms, task T3 is not complete and the execution timer has not yet expired. Therefore, at step 230, the task processor 150 continues execution of task T3.

At TIME=26 ms, task T3 is not complete and the execution timer has not yet expired. Therefore, at step 230, the task processor 150 continues execution of task T3.

At TIME=27 ms, task T3 is not complete and the execution timer has not yet expired. Therefore, at step 230, the task processor 150 continues execution of task T3.

At TIME=28 ms, task T3 is still executing but the execution timer has expired. Consequently, at step 265, the task processor 150 saves the state of task T3 and, at step 270, suspends this task. The task processor 150 then verifies the task set 140 and determines that it contains tasks T2 and T3. Applying the same criterion as before, it is noted that task T3 has been suspended fewer times (once) than task T2 (twice). Thus, the step of selecting a task at step 210 will result in task T2 being selected as the next task to be advanced to completion. At step 220, the task processor 150 resets the execution timer and, at step 230, restores the state of task T2 and resumes execution of this task.

At TIME=29 ms, task T2 is not complete and the execution timer has not yet expired. Therefore, at step 230, the task processor 150 continues Execution of task T2.

At TIME=30 ms, task T2 is not complete and the execution timer has not yet expired. Therefore, at step 230, the task processor 150 continues execution of task T2.

At TIME=31 ms, task T2 is not complete and the execution timer has not yet expired. Therefore, at step 230, the task processor 150 continues execution of task T2.

At TIME=32 ms, task T2 is not complete and the execution timer has not yet expired. Therefore, at step 230, the task processor 150 continues execution of task T2.

At TIME=33 ms, task T2 is still executing but the execution timer has expired. Consequently, the task processor 150 saves the state of task T2 and step 265 and suspends this task at step 270. The task processor 150 then verifies the task set 140 and determines that the task set 140 contains tasks T2 and T3. Applying the same criterion as before, it is noted that both tasks T2 and T3 have been suspended the same number of times (i.e., twice), but that task T3 has been in the task set 140 longer than task T2. Therefore, the step of selecting a task at step 210 will result in selection of task T3 as the next task to be advanced towards completion. At step 220, the task processor 150 resets the execution timer and, at step 230, restores the state of task T3 and resumes execution of this task.

At TIME=34 ms, task T3 is not complete and the execution timer has not yet expired. Therefore, at step 230, the task processor 150 continues execution of task T3.

At TIME=35 ms, task T3 is not complete and the execution timer has not yet expired. Therefore, at step 230, the task processor 150 continues execution of task T3.

At TIME=36 ms, task T3 is complete and, as a result, the task processor 150 executes step 250 to remove task T3 from the task set. Since the only other task in the task set 140 is task T2, the task processor 150 has no difficulty in selecting, at step 210, task T2 as the next task to be advanced towards completion. At step 220, the task processor 150 resets the execution timer and, at step 230, restores the state of task T2 and resumes execution of this task.

At TIME=37 ms, task T2 is complete and, as a result, the task processor 150 executes step 250 to remove task T2 from the task set 140. Since there are no other tasks in the task set 140, the task processor 150 does nothing until an incomplete task appears in the task set 140.

Thus, it should be appreciated that by adding step 280, which may be performed at any time and need not be performed immediately prior to the selection step (210), the task processor 150 is able to recognize when a particular task in the task set 140 is a new version of an existing task in the task set 140 and, furthermore, is able to cause removal of the older version of the task from the task set 140. Advantageously, this frees up the task processor 150 and allows it to provide more efficient processing of the remaining tasks in the task set 140.

Of course, it should be understood that by "removal" of a task from the task set, this is to be interpreted broadly as either physical deletion from memory or a more abstract notion. For example, the concept of abstract "removal" of a task from the task set 140 includes modifying a field in a record which represents a task to the effect that it may indicate that the task is complete rather than incomplete.

It should be further understood that the task processing methods of the present invention may be applied to environments, other than routing protocol environments, where multiple tasks need to be processed. For example, the present invention may be applied to the situation in which multiple software applications need to be processed by a centralized processing entity.

Those skilled in the art should appreciate that in some embodiments of the invention, all or part of the functionality previously described herein with respect to task scheduling and task processing may be implemented as pre-programmed hardware or firmware elements (e.g., application specific integrated circuits (ASICs), electrically erasable programmable read-only memories (EEPROMs), etc.), or other related components.

In other embodiments of the invention, all or part of the functionality previously described herein with respect to task scheduling and task processing may be implemented as software consisting of a series of program instructions for execution by a digital computer, including a processing unit and a memory connected by a communication bus. Such memory includes data and the program instructions. The processing unit is adapted to process the data and the program instructions in order to implement the functional blocks described in the specification and for which the operation is depicted in the drawings.

The program instructions could be stored on a medium which is fixed, tangible and readable directly by the computer system, (e.g., removable diskette, CD-ROM, ROM, or fixed disk), or the program instructions could be stored remotely but transmittable to the computer system via a modem or other interface device (e.g., a communications adapter) connected to a network over a transmission medium. The transmission medium may be either a tangible medium (e.g., optical or analog communications lines) or a medium implemented using wireless techniques (e.g., microwave, infrared or other transmission schemes).

Those skilled in the art should further appreciate that the program instructions may be written in a number of programming languages for use with many computer architectures or operating systems. For example, some embodiments may be implemented in a procedural programming language (e.g., "C") or an object oriented programming language (e.g., "C++" or "JAVA").

While specific embodiments of the present invention have been described and illustrated, it will be apparent to those skilled in the art that numerous modifications and variations can be made without departing from the scope of the invention as defined in the appended claims.

I claim:

1. A method of executing a set of at least one incomplete task, comprising:
    (a) selecting an incomplete task from the set on the basis of an expected duration until completion for that task;
    (b) resetting an execution timer having an expiry condition, wherein the expiry condition is a pre-determined percentage of completeness of the selected task;
    (c) advancing execution of the selected task until the earlier of (i) completion of the selected task or (ii) expiry of the execution timer; and (d) upon expiry of the execution timer prior to completion of the selected task, suspending execution of the selected task.

2. A method as defined in claim 1, wherein advancing execution of the selected task includes beginning the selected task if the selected task has not been previously suspended.

3. A method as defined in claim 2, wherein advancing execution of the selected task includes resuming the selected task if the selected task has been previously suspended.

4. A method as defined in claim 3, wherein suspending the selected task includes saving a context associated with the selected task.

5. A method as defined in claim 4, wherein resuming the selected task includes retrieving the previously saved context associated with the selected task.

6. A method as defined in claim 5, wherein the context associated with the selected task includes variables local to the selected task.

7. A method as defined in claim 5, wherein the context associated with the selected task includes a state of the selected task.

8. A method as defined in claim 5, wherein the context associated with the selected task includes a state of a central processing unit (CPU).

9. A method of executing a set of at least one incomplete task, comprising:

(a) selecting an incomplete task from the set on the basis of a number of times that the task has been previously suspended;

(b) resetting an execution timer having an expiry condition, wherein the expiry condition of the execution timer is a pre-determined percentage of completeness of the selected task;

(c) advancing execution of the selected task until the earlier of (i) completion of the selected task or (ii) expiry of the execution timer; and (a) upon expiry of the execution timer prior to completion of the selected task, suspending execution of the selected task.

* * * * *